United States Patent [19]

Dewan et al.

[11] 4,024,444

[45] May 17, 1977

[54] DRIVE CIRCUIT FOR INDUCTION MOTOR USED IN AIR CONDITIONING SYSTEM OF A RAILWAY VEHICLE

[75] Inventors: Shashi B. Dewan, Toronto, Canada; Robert M. Olsen, Barrington, Ill.

[73] Assignee: Vapor Corporation, Chicago, Ill.

[22] Filed: July 14, 1975

[21] Appl. No.: 595,440

[52] U.S. Cl. ............................. 318/227; 318/230; 318/231

[51] Int. Cl.² ........................................... H02P 5/40

[58] Field of Search .................. 318/227, 230, 231

[56] References Cited

UNITED STATES PATENTS

| | | | |
|---|---|---|---|
| 3,365,638 | 1/1968 | Risberg | 318/227 X |
| 3,584,279 | 6/1971 | Krauthamer et al. | 318/227 |
| 3,603,866 | 9/1971 | Opal | 318/227 X |
| 3,617,840 | 11/1971 | Salihi | 318/227 |
| 3,700,989 | 10/1972 | Jensen | 318/227 |

Primary Examiner—Gene Z. Rubinson
Attorney, Agent, or Firm—Francis J. Lidd

[57] ABSTRACT

A drive circuit for an induction motor used in an air conditioning system of a railway vehicle operable from an applied high voltage direct current, which circuit comprises a chopper circuit having its input connected to the high voltage direct current and its output connected to a three-phase variable frequency inverter circuit which, in turn, has its output connected to the induction motor. A voltage feedback is employed to control the current output of the chopper circuit and the frequency of the inverter circuit.

25 Claims, 7 Drawing Figures

DRIVE CIRCUIT FOR INDUCTION MOTOR USED IN AIR CONDITIONING SYSTEM OF A RAILWAY VEHICLE

BACKGROUND OF THE INVENTION

This invention is directed to drive circuits for induction motors used in air conditioning systems, and more particularly to a drive circuit for an induction motor used in an air conditioning system which is adapted for installation in a railway vehicle.

In recent years it has become almost universal practice to provide air conditioning systems in all types of passenger railway vehicles. In the case of rapid transit and other electrically driven railway vehicles, the only practical power source for the compressor motors and fan motors of such air conditioning systems in the high-voltage DC source used to power the vehicle, which may be provided by means of a pickup or shoe contacting a third rail or by means of a pantograph contacting an overhead wire. This power source has not been entirely satisfactory for direct application to DC motors because of the severe transients which are often developed as the vehicle passes over switches and open blocks where power may be temporarily interrupted.

Moreover, due to track position requirements, power is drawn from alternate shoes located on either side of the vehicle. While these shoes are electrically connected in parallel, establishing and breaking electrical contact is not always done smoothly or in complete synchronization. Therefore, the vehicle can be completely without power many times during normal operation. This sudden interruption and reapplication of the power souce establishes electrical transients and other disturbances.

Furthermore, the power supply voltage, which typically measures in excess of 600 volts and may vary widely over different sections of track, is difficult to regulate and presents special motor insulation and stability problems. Attempts at reducing the voltage applied to the DC motors by provision of series resistors between the power source and the motors have not only undesirably wasted power, but have also created additional cooling and ventilation problems for vehicle manufacturers.

Another problem with prior art DC motors is that they require periodic brush replacement and frequent overhaul of commutator segments due to arcing across the segments. The high maintenance required of these motors makes their use in railway vehicles unnecessarily costly and detracts from the reliability of the vehicle.

One potentially successful solution to this problem has been to use induction motors in the air conditioning system, in conjunction with an onboard DC to AC converter to convert the third-rail direct current to alternating current. Induction motors, which have no commutators and brushes, have proven to be substantially more reliable than brush motors. The use of induction motors for vehicle ventilation with their inherent reliability substantially reduces the possibility of car ventilation loss. This is particularly important because a paradoxial consequence of complete air conditioning in railway vehicles is the total dependence on forced ventilation of the occupied space. The limited cooling capacity of the system necessitates controlled circulation of ventilating air which places a great reliability burden on vehicle air moving equipment, in particular the ventilating blowers. Any failure of the ventilating equipment renders an occupied vehicle uninhabitable in a very short time due to increased temperature and buildup of moisture, resulting in extreme discomfort to the passengers.

Previous approaches to providing onboard power converters for induction motors have not been entirely satisfactory. For instance, one approach has been to provide a motor-alternator (MA) set on the vehicle to convert the third-rail direct current to alternating current. Difficulties have been encountered due to the weight and complexity of MA sets, which add unnecessarily to the vehicle gross weight and hence increase cost of manufacture and operation of the vehicle. Furthermore, MA sets themselves require periodic brush replacement and maintenance and therefore at best achieve only a partial reduction in maintenance. Prior art attempts at providing static solid-state motor drive circuits for this purpose have also been unsuccessful because the adverse electrical and physical environment in which such motor drive circuits must operate has heretofore prevented the degree of stability and reliability necessary for successful application to a railway vehicle air conditioning system. In addition, the repeated interruptions of third rail power and electrical transients present in a third rail power source, which were previously described, presents an additional operating condition, which in the past, has been particularly troublesome to solid state motor drive circuits operating on railway vehicles.

Other car power sources may also be encountered. For example if train operation from single phase or three phase alternating current supplied from a catenary construction is required, transformer-rectifier combinations are normally used to provide the high voltage DC supply for traction and other auxiliary functions such as air conditioning.

An object of the present invention is the provision of a solid-state circuit for driving an induction motor in an air conditioning system of a railway vehicle from the high voltage DC supply which powers the vehicle.

It is also an object of this invention to provide a solid-state circuit for converting direct current to alternating current of varying frequency utilizing feedback means to provide satisfactory starting and operation of a number of induction motors; operating over wide load ranges. The individual motors can be of substantially different horsepower ranges, and can be operated singly or in any combination.

An additional object of the invention is a novel semiconductor direct current chopper utilizing a novel commutation scheme.

A further object of the invention is to provide a solid-state circuit which is free from many of the transient induced malfunctions normally found in this class of equipment.

SUMMARY OF THE INVENTION

Accordingly, for use in a railway vehicle operable from an applied high-voltage direct current, or other sources convertible to direct current, the invention is directed to a drive circuit for induction motors which may drive the compressor and/or fans of an air conditioning system. The drive circuit includes a solid-state DC-AC converter or chopper circuit for converting the applied high-voltage direct current to a regulated direct current and an inverter circuit for converting the regulated direct current into alternating current is applied to the induction motor. A second feedback signal indicative of the voltage applied to the motor is applied to the chopper circuit to regulate its output current in accordance with the motor voltage. A first feedback signal, also indicative of the voltage applied to the motor, is applied to the inverter circuit to regulate its frequency in accordance with the motor voltage.

BRIEF DESCRIPTION OF THE DRAWINGS

Further objects and advantages of the present invention can best be understood by reference to the following description taken in connection with the accompanying drawings, in which.

DESCRIPTION OF THE PREFERRED EMBODIMENT

Figure 1:
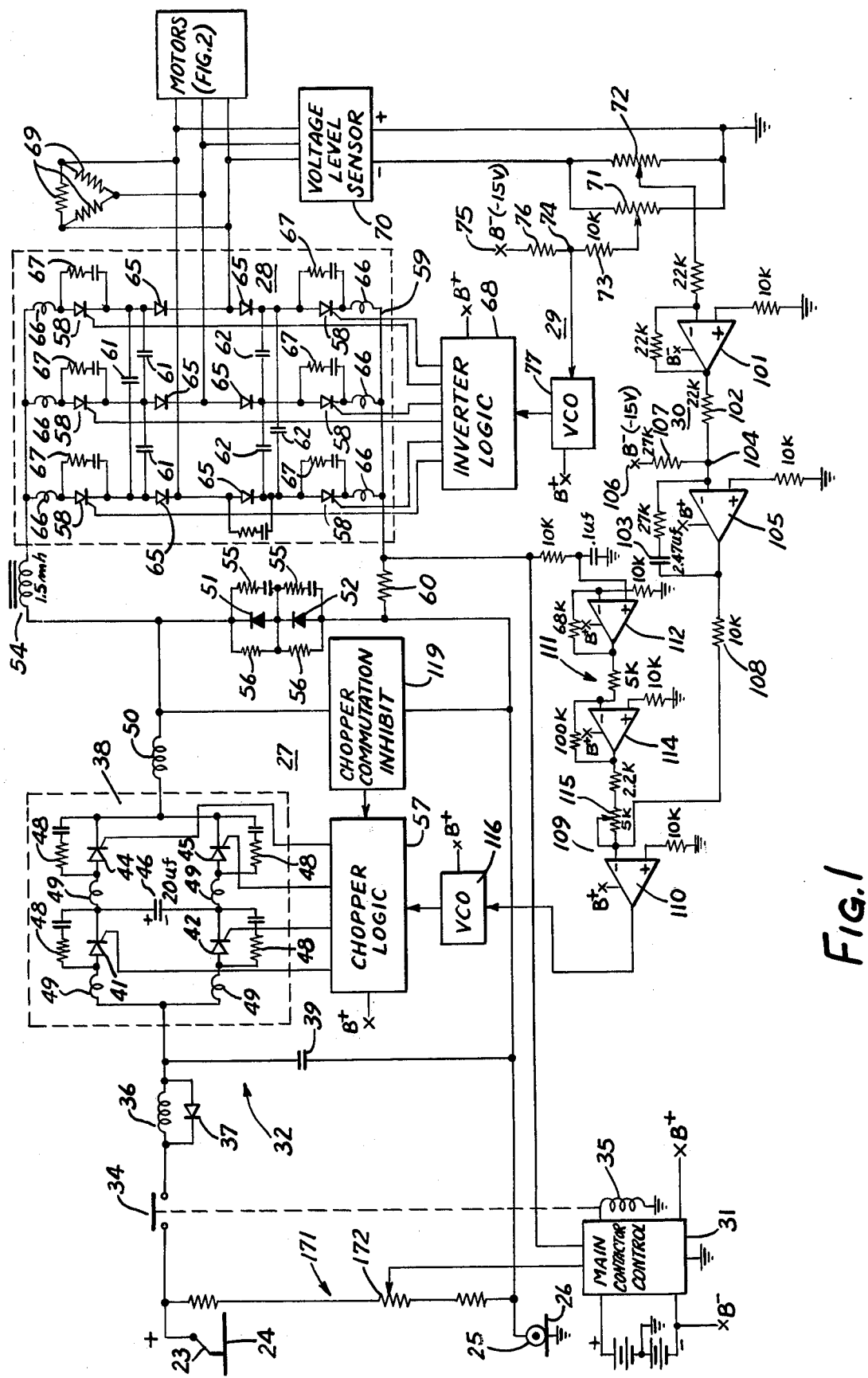
FIG. 1 is a schematic diagram, partially in block form, of a drive circuit for induction motors used in conjunction with an air conditioning system for a railway vehicle.
Figure 2:
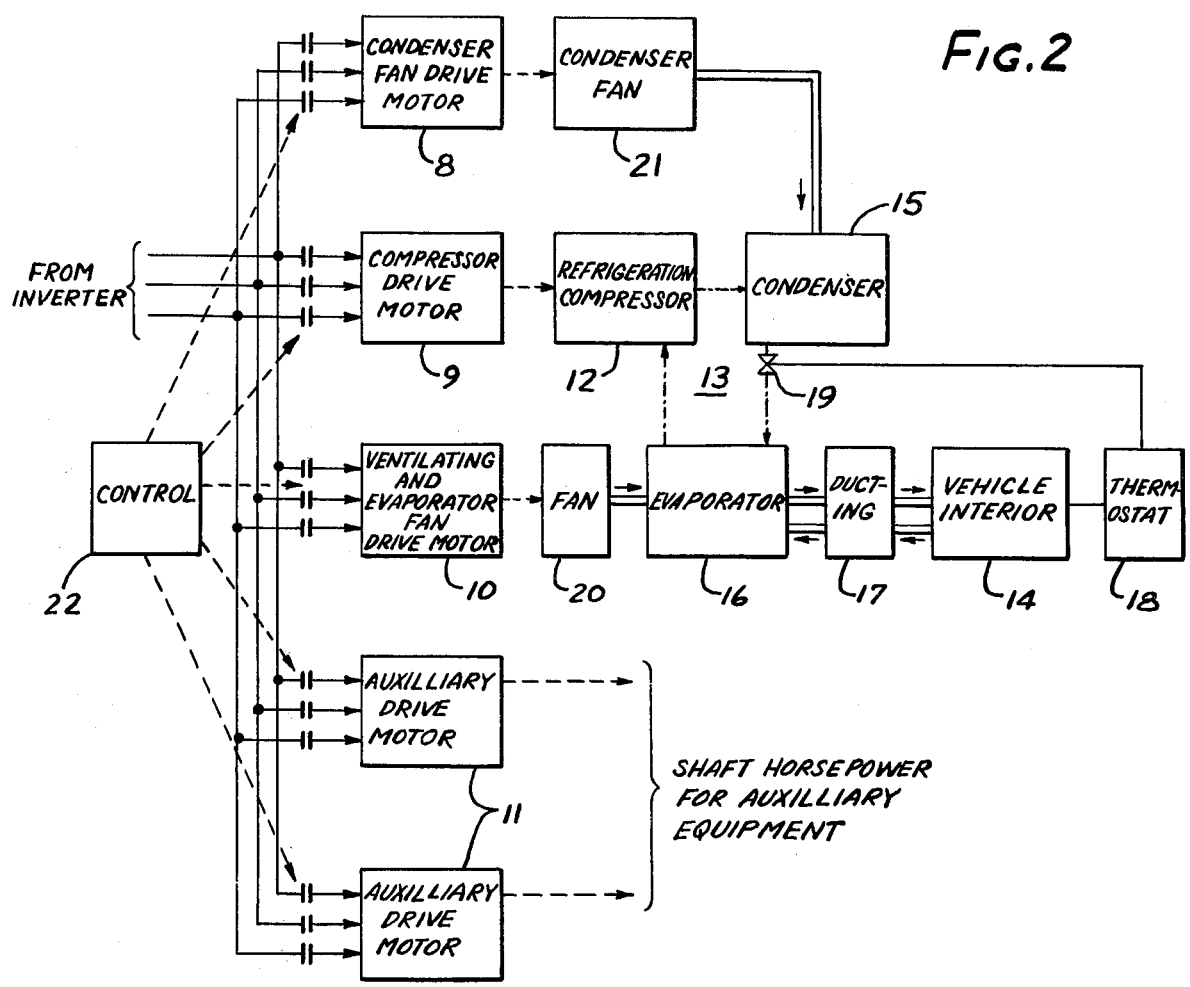
FIG. 2 is a block diagram of the air conditioning system shown in FIG. 1.

Referring to FIGS. 1 and 2, the drive circuit in accordance with the present invention, is shown connected to several induction motors 8, 9, 10 and 11 having substantially different power requirements. For example, the compressor drive motor 9 may draw 20 KW at full load, while the ventilating and evaporator fan drive motor 10 is usually about 7 KW. As indicated above, the compressor drive motor 9 drives a compressor 12 of an air conditioning system 13 employed to cool the interior 14 of a railway vehicle. Other auxiliary drive motors 11 indicated on FIG. 2 can be encountered in vehicular operation but do not materially affect the operation of the system described. The air conditioning system 13 may be of the conventional type and the illustrated drive circuit is designed for use with a continually operated compressor 12. In the conventional manner, a condenser 15 is connected to the compressor 12 and an evaporator 16 is connected through an expansion valve (not shown) to the condenser 15, which evaporator 16 is disposed in duct work 17 which is in communication with the interior 14 of the railway vehicle. The temperature of the interior 14 of the railway vehicle is regulated by a thermostat 18 which controls a valve 19 between the condenser 15 and the evaporator 16 which valve prevents the refrigerant from entering the evaporator 16. Of course, the drive circuit may also be employed with an on-off operated compressor, the on-off operation being controlled by a thermostat.

As shown, the drive circuit is also connected so as to power a second three phase induction motor 10 which is used to drive a fan 20 in the evaporator 16 and a third three phase induction motor 8 which is used to drive a fan 21 in the condenser 15. Additional induction motors 11 may be powered by the drive circuit. A control circuit 22 is provided to manually or automatically connect the induction motors 8, 9, 10 and 11 to the drive circuit so that any number of the induction motors may be selectively powered by the drive circuit.

The railway vehicle is powered by means of a power pickup shoe 23 in contact with a third rail DC power source 24. The vehicle operates on two trucks 25 which rest on a pair of rails 26, the latter serving as the ground return for the DC power source. As illustrated in FIG. 1, the drive circuit is also powered by the DC power source of the railway vehicle, i.e., the pickup shoe and grounded trucks.

Generally, the drive circuit illustrated in the drawings comprises a chopper circuit 27 for converting the applied high voltage direct current from the third rail pickup shoe 23 to a regulated direct current, and an inverter circuit 28 for converting the regulated direct current from the chopper circuit 27 to three-phase alternating current suitable for powering the compressor drive motor 9, the fan motors 8 and 10 and the auxiliary drive motors 11. A first voltage feedback circuit 29 is provided for controlling the frequency of the inverter circuit 28 in response to the voltage applied to the motors 8, 9, 10 and 11 so as to provide a preselected voltage-to-frequency ratio. A second voltage feedback circuit 30 is provided to regulate the output current of the chopper circuit 27 in accordance with the motor voltage. A main contactor control circuit 31 is provided at the input to the drive circuit for interrupting current to the drive circuit in the event of either an over-voltage condition on the third rail power source 24 or on over-current condition in the output of the chopper circuit 27.

Considering the chopper circuit 27 in detail, the positive-polarity direct current picked up by the third rail shoe 23 is applied to one terminal of a transient suppression circuit 32 through the normally open contact 34 of a master contactor 35. The transient suppression circuit 32 includes a parallel connected inductor 36 and reverse biased diode 37, which are connected in series with the input to a chopper 38, and a capacitor 39 connected between the chopper input and the ground 25. The input to the chopper 38 is connected to the anodes of a first pair of silicon controlled rectifiers (SCR's) 41 and 42. The cathodes of the first pair of SCR's 41 and 42 are connected to the anodes of respective ones of a second pair of SCR's 44 and 45. The cathodes of the second pair of SCR's 44 and 45 are connected together and to the output of the chopper 38. A commutating capacitor 46 is coupled between the junction of the SCR's 41 and 44 and the junction of the SCR's 42 and 45.

Each of the SCR's 41–45 is shunted by a series resistor-capacitor combination 48 for suppressing voltage transients in the chopper 38. Moreover, an inductor 49 is serially connected in the anode circuit of each of the SCR's 41–45 to control current transients in the chopper 38. The inductor as shown is required in certain applications, however, when the preferred form of a commutation inhibit circuit to be described later is used, those inductors can usually be eliminated. An inductor 50 is serially connected in the output of the chopper 38 to filter current transients in the chopper output waveform.

The output of the chopper 38 is connected to ground through a pair of series-connected, back-biased diodes 51 and 52 which act as a free-wheeling circuit for a filter and commutation inductor 54 connected in series with the output of the chopper 38. The diodes 51 and 52 are each shunted by a series resistor-capacitor voltage transient suppression network 55 and a load equalizing resistor 56.

The gate electrodes of each of the four SCR's 41–44 are connected to a chopper logic circuit 57 described hereinafter which controls the timing and duration of the conduction of the SCR's in response to varying load conditions imposed on the chopper circuit 27 and in response to the voltage applied to the motors 8, 9, 10 and 11. In this way, the chopper circuit output current is regulated. The manner in which the output current is regulated is explained in conjunction with the following description of the operation of the chopper circuit 27 with particular reference to the waveforms shown in FIG. 6.

Figure 6:
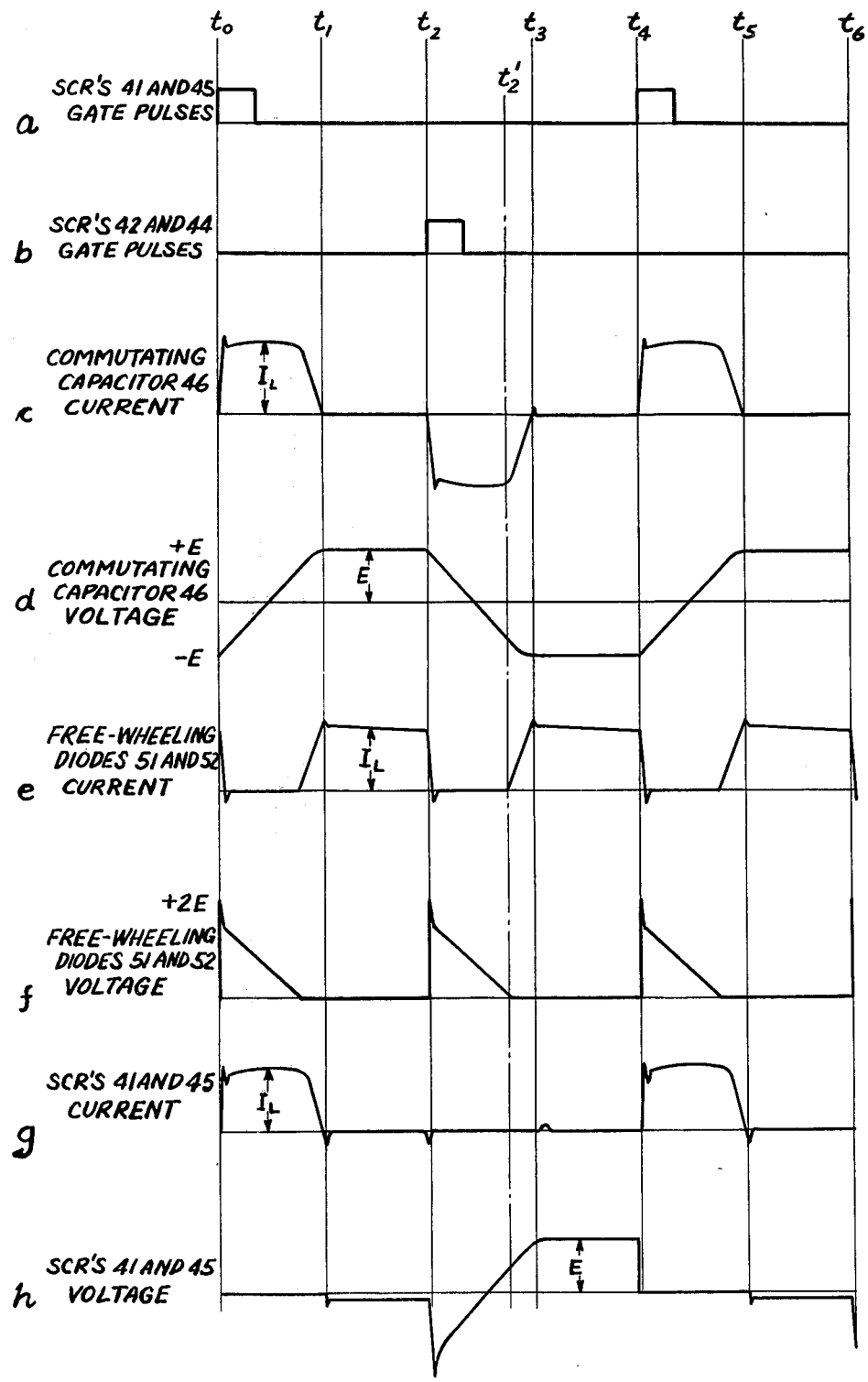
FIG. 6 is a presentation of various waveforms associated with the chopper circuit of FIG. 1 and useful in explaining the operation thereof.

The inverter circuit 28 is effectively a non-reactive load for the chopper circuit 27 and will henceforth be considered as such to simplify explanation of the operation of the chopper circuit 27. Likewise, the effect of the transient suppression inductors 49 and 50 is neglected. Assuming the initial condition at time $t_o$ (FIG. 6) wherein the commutating capacitor 46 is charged to the voltage E of the high voltage source 24 but in a negative direction (−E) (FIG. 6d), and then the first two SCR's 41 and 45 are rendered conductive by gating pulses (FIG. 6a) applied to their gate electrodes. The commutating capacitor 46 discharges through the SCR's 41 and 45, (times $t_o$ to $t_1$ in FIGS. 6c and 6d) the filter inductor 54 and the effective load (the inverter 28) and then at time $t_1$ is charged by the high voltage source in the positive direction (+E). As the commutating capacitor 46 reaches its fully charged positive state, (FIGS. 6d, time $t_1$) the charging current through the first two SCR's 41 and 45 decreases to zero (FIG. 6g, time $t_1$) effectively commutating, or turning off these SCR's. However, the commutating inductor 54, which is of sufficiently large inductance to provide a substantially constant current to the effective load, opposes any decrease in current flowing therethrough and effectively maintains current flow through the load by way of current flowing through the free-wheeling diodes 51 and 52 (FIG. 6e). It should be noted from FIG. 6f that from the time $t_o$ until the time when the charging current decreases (FIG. 6c), the voltage across the diodes back-biases the diodes thereby preventing the charging current from the first two SCR's from passing to ground.

Before the current through the diodes 51 and 52 and the inductor 54 decays to any extent, (FIG. 6e, time $t_2$) the second two SCR's 42 and 44 are rendered conductive by pulses applied to their gate electrodes (FIG. 6b, time $t_2$), so that capacitor 46 is again in series with the effective load. When this occurs, as shown in FIG. 6h, a reverse bias voltage is applied to the first two SCR's 41 and 45 by the commutating capacitor 46, thereby assuring that the non-conducting SCR's are turned off. It should be noted that SCR's 42 and 44 are not rendered conductive until the value of current in capacitor 46 is reduced to a level which will not produce excessive transient voltages during the commutation of SCR's 41 and 45. This is accomplished through the use of a chopper commutation inhibit circuit. Now, current flows through the second two SCR's 42 and 44, the inductor 54 and the effective load (FIG. 6c, times $t_2$–$t_3$) as the capacitor 46 is charged to an opposite polarity by the third-rail power source 24 (FIG. 6d, times $t_2$–$t_3$). When the capacitor 46 again becomes fully charged (FIG. 6d, time $t_3$), current flow through the second two SCR's 42 and 44 stops, commutating these elements, and the inductor 54 again maintains current flow through the effective load by way of the diodes 51 and 52 (FIG. 6e, times $t_3$–$t_4$). Before this diode current decays to any extent, the first two SCR's 41 and 45 are again rendered conductive (FIG. 6, time $t_4$) and the capacitor 46 is again caused to charge to the forward polarity through the second two SCR's 41 and 45, the inductor 54, and the effective load (FIG. 6, times $t_4$–$t_5$).

Thus, a continuous unidirectional current is maintained through the effective load, alternately supplied by the SCR's 41–45 and the energy stored in the commutating inductor 54. The current continues as long as power is applied to the chopper circuit 27 and the associated chopper logic is alternately rendering the SCR's 41–45 conductive.

The average DC current ($I_L$) developed in the effective load is dependent on the average frequency ($f_c$) at which the SCR's 41–45 are cycled. Specifically, the following approximate relationship applies:

$$I_L = \frac{2f_c EC}{E_L}$$

where:
$E_L$ is the chopper circuit output voltage;
C is the capacity of the commutating capacitor 46; and
E is the supply voltage.

It is this relationship that enables the load current $I_L$ to be regulated by varying the average chopping frequency in response to signals on the logic circuit 57 when the supply voltage (E) or the output voltage ($E_L$) varies.

It is to be noted that the peak voltage applied to each SCR is limited to the supply voltage (E), that no higher current than the load current ($I_L$) flows through each SCR, and that current and voltage transients in the chopper are low. This permits the use of less expensive SCR's and increases the system reliability. Furthermore, the circuit provides fail safe operation, since removal of the SCR gate pulses for any reason removes current from the load. Complete commutation of the SCR's is also assured by the circuit, since the commutating capacitor strongly reverse biases the nonconducting SCR's at the beginning of each half cycle.

As previously stated, the regulated direct current at the output of the chopper circuit 38 is applied to the inverter circuit 28 which converts this current to the alternating current suitable for powering the induction motors 8, 9, 10, and 11, each of which may develop as much as 20 horsepower and typically may require a 220 volt three-phase power source. Basically, the illustrated inverter circuit 28 includes six silicon controlled rectifiers (SCR's) 58 connected together in a three-phase bridge circuit arrangement, with the bridge circuit being connected between the chopper circuit output and a neutral line 59. The neutral line is connected through a shunt 60, hereinafter described, to the ground line 25. The center connections of the bridge circuit are respectively connected to the three field windings of the motors 8, 9, 10 and 11 which serve as a rotating filter to afford a sinusoidal output waveform. Three commutating capacitors 61 are connected between respective ones of the cathodes of the three SCR's 58 in the input legs of the bridge. Similarly, three commutating capacitors 62 are connected between respective ones of the anodes of the three SCR's 58 in the output legs of the bridge circuit. The commutating capacitors 61 and 62 are isolated from the field windings of the motors 8, 9, 10 and 11 by connecting a forward biased diode 65 in each leg of the bridge circuit between the capacitor connection and the field winding connection. Current transients are suppressed in the inverter circuit 28 by connecting as inductor 66 in the anode circuit of each input SCR 58 and in the cathode circuit of each output SCR 58. Voltage transients are suppressed by connecting a series connected resistor and capacitor 67 across each SCR 58. Ballast resistors 69 connected in a delta configuration are connected across the output of the inverter circuit 28 to absorb some part of the regenerative current, as described hereinafter.

The SCR's 58 are gated by pulses developed in an inverter logic circuit 68, described hereinafter, connected to the gates of the SCR's 58. The logic circuit 68 provides timed gating pulses so that the three input SCR's 58 conduct for 120° during each cycle of operation, and the three output SCR's 58 conduct for 120° during each cycle, but with a phase displacement of 60° from the input SCR's. In this manner, a three-phase rotating field is formed within the motors 8, 9, 10 and 11. Only two SCR's are on at one time, and the "on" SCR's are each turned off by the firing of the adjacent SCR in the next phase.

Referring now to the first voltage feedback circuit 29, as previously explained, the frequency of the inverter circuit 28 is varied in accordance with the voltage applied to the motors 8, 9, 10 and 11 to provide a preselected voltage to frequency ratio. In this connection, the output voltage of the inverter circuit 28 is sensed by a voltage level sensor 70, which may include a three-phase rectifier circuit (not shown) having its input connected to the three output lines of the inverter circuit 28, which rectifier circuit provides at its output a relatively low negative voltage (e.g. 0 to −15 volts) which varies with the motor voltage. This output voltage is applied across a pair of potentiometers 71 and 72, the first of which is employed to adjust the desired voltage to frequency ratio. In this connection, the adjustable tap of the first potentiometer 71 is connected through an isolating resistor 73 to a summation junction 74 whereat the negative current provided by first potentiometer 71 is added to a negative current supplied by a negative voltage source 75 (e.g., −15V) connected through an isolating resistor 76 to the summation junction. As will become apparent from the following description, the first voltage feedback circuit 29 is arranged so that as the voltage level on the motors 8, 9, 10 and 11 increases, the current input to a voltage control oscillator (VCO) 77, becomes more negative, increasing the frequency of the VCO and hence also that of the inverter circuit 28 connected thereto through the inverter logic circuit 68. The negative voltage source 75 sets the minimum operating frequency of the inverter circuit 28 by supplying to the voltage controlled oscillator 77 a minimum negative current. Possible harm to the motors is prevented by the minimum frequency of the voltage controlled oscillator 77 and a current limit of the chopper described below.

Figure 3:
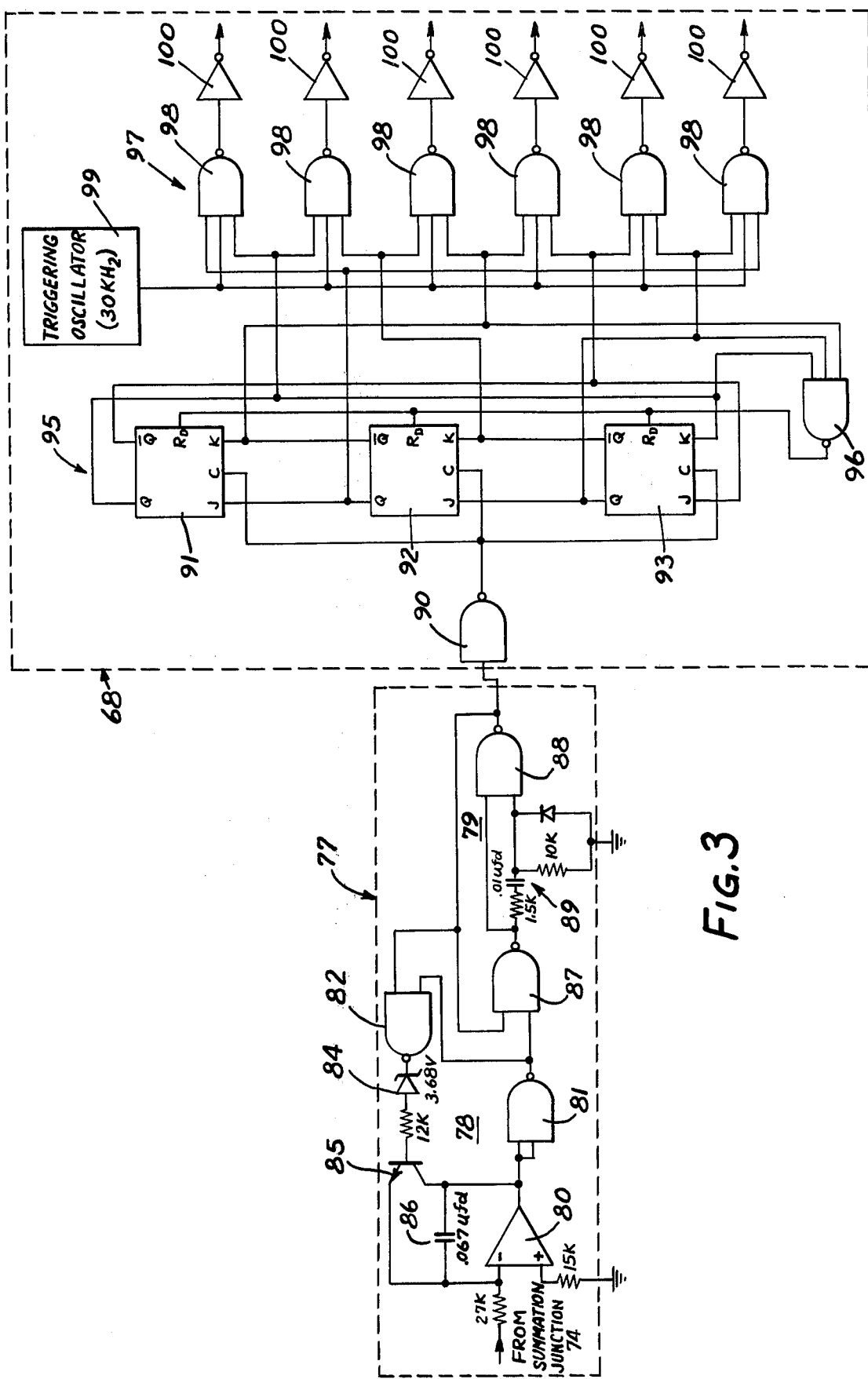
FIG. 3 is a schematic diagram, partially in block form, of the voltage controlled oscillator and the inverter logic circuits shown in FIG. 1.

As shown in FIG. 3, the voltage controlled oscillator include a variable frequency saw tooth generator 78, the average frequency of which is determined by the amplitude of the negative current received from the summation junction 74, and a monostable multivibrator 79 connected to the output of the generator 78 for providing a shaped pulse for each cycle of the saw tooth generator. The saw tooth generator 78 includes an operational amplifier 80 having applied to its inverting input the signal from the summation junction. The output of the operational amplifier is connected through a first NAND circuit 81, serving as an inverter and level detector, to one input of a second NAND circuit 82. The second input of the second NAND circuit 82 is connected with the normally high output of the monostable multivibrator 79 for a purpose set forth hereinafter. The output of the second NAND circuit 82 is applied through a zener diode 84 to the base of an npn transistor 85 whose emitter-collector circuit is connected across a capacitor 86 which serves as a feedback element between the output and input of the operational amplifier 80, whereby the operational amplifier 80 acts as an integrator. Thus, each momentary turn on of transistor 85 discharges the capacitor 86 causing the saw tooth generator 78 to being a new cycle. The higher the input current to the operational amplifier 80, the steeper the slope of the saw tooth and hence the higher its frequency. The negative voltage source 75, as previously mentioned, sets the minimum frequency of the VCO 77 and the capacitor 86 is selected to provide the maximum frequency (e.g., for a 60 hertz operation of the motor the capacitor is selected to provide a 360 hertz operation of the saw tooth generator 78).

The monostable multivibrator 79 includes an input NAND circuit 87 having one of its inputs connected to the output of the saw tooth generator 78 and having its output connected both to one input of an output NAND circuit 88 and through a delay circuit 89 to the second input of the output NAND circuit. The output of the output NAND circuit 88 is fed back to the second input of the input NAND circuit 87. As previously indicated, the output is also connected to the second input of the second NAND circuit 82 of the saw tooth generator 78 to insure that the saw tooth generator does not begin a new cycle until the multivibrator switches back to its normal state.

The outpu pulses from the multivibrator 79 are inverted by a NAND circuit 90 and are applied to the clock inputs of three JK flip-flops 91, 92 and 94 connected in a switch-tail ring counter configuration 95. A NAND circuit 96 having its inputs connected to three outputs of the JK flip-flops 91, 92 and 93 provices a self-starting and correcting count sequence. The six outputs of JK flip-flops 91, 92 and 93 are applied to a gated decoder 97 formed by six NAND gates 98. Selected ones of two inputs on each of six NAND circuits 98 are connected to the six outputs of the JK flip-flops 91, 92 and 93 so that the NAND circuits are enabled in a predetermined order, as the ring counter 95 progresses through its counting stage. The exact order is determined by which of the SCR's 58 in the inverter circuit 28 are associated with which of the NAND circuits 98 and the requirement of generating the three-phase current at the output of the inverter circuit 28, as previously mentioned.

The remaining input on each of the NAND gates 97 is connected to the output of a triggering oscillator 99, which may be a conventional free-running multivibrator, that generates narrow high frequency pulses suitable for triggering the SCR's 58. When any of the NAND circuits 98 are enabled, the pulses from the oscillator 99 will appear at its output. The outputs of the six NAND gates 98 are coupled respectively to the inputs of six triggering amplifiers 100. The amplified gating signals provided by these amplifiers 100 are applied to the gates of the SCR's 58 and gate these SCR's 58 into conduction in a cyclical order at a rate dependent on the output voltage of the inverter circuit 28.

As previously indicated, the output voltage of the inverter circuit 28 is also employed to control the current output of the chopper circuit 27 by means of the second feedback circuit 30. In this connection, the second potentiometer 72 connected across the voltage level sensor 70 has its adjustable tap connected to the inverting input of an inverting operational amplifier 101 whose output is applied through an input resistor 102 to a summation junction 104 at the inverting input of a delayed-high gain operational amplifier 105 serving as a comparator. The delay in the high gain is provided by the series capacitor 103 in the feedback circuit of the operational amplifier 105 and is selected so that the operational amplifier 105 has a low gain for a few cycles of operation of the inverter circuit 28 after a change in motor voltage and a very high gain thereafter (i.e., low gain for quick changes in motor voltage and high gain for slow changes). The purpose of the delayed high gain is described hereinafter.

At the summation junction 104, the adjusted feedback voltage is compared with a fixed negative voltage supplied thereto by an input resistor 107 connected to a negative power supply 106 (e.g.—15V), the fixed negative voltage serving to limit the voltage level reached by the inverter circuit output. The output voltage level is adjusted to a select value by adjusting the tap on the potentiometer 72 and thereby setting the ratio of the sensed voltage applied to the summation junction 104. In this connection, during startup, a high negative voltage is applied to the comparator amplifier 105 which negative voltage decreases as the voltage at the output of the inverter circuit 28 increases.

The output of the comparator amplifier 105 is connected through an input resistor 108 to a second summation junction 109 disposed at the inverting input of a second high gain comparator operational amplifier 110 whereat the demand signal from the voltage feedback circuit 30 is compared with the demand signal from a current limiting feedback circuit 111. The current limiting circuit 111 senses the level of the current flowing through the low voltage shunt resistor 60, amplifies this sensed signal by a pair of, serially connected, relatively low gain operational amplifiers 112 and 114, and feeds the amplified signal through an adjustable resistor 115 to the summation junction 109. The polarity of the current limiting demand signal is such as to be opposite the voltage demand signal.

Because of the delayed high gain of the voltage feedback circuit 30 and the relatively low gain of the current limiting circuit 111 as compared to that of the voltage feedback circuit 30 under steady state conditions the current limiting circuit 111 mainly controls the operation of the chopper circuit 27 during quick changes in the current demand of the inverter circuit 28. These quick changes occur during startup of the motors 8, 9, 10 and 11 and during switching of the SCR's 58 in the inverter circuit 28 when the commutating capacitors 61 and 62 require high currents. The adjustable resistor 115 is adjusted to provide the desired maximum current level during these quick changes.

The output of the second comparator amplifier 110 is connected to the input of a voltage controlled oscillator (VCO) 116, to control the frequency thereof, which VCO, in turn, is connected to the chopper logic circuit 57 to control the rate of the cyclic turn-on of the SCR's 41–45 in the chopper 38.

Figure 4:
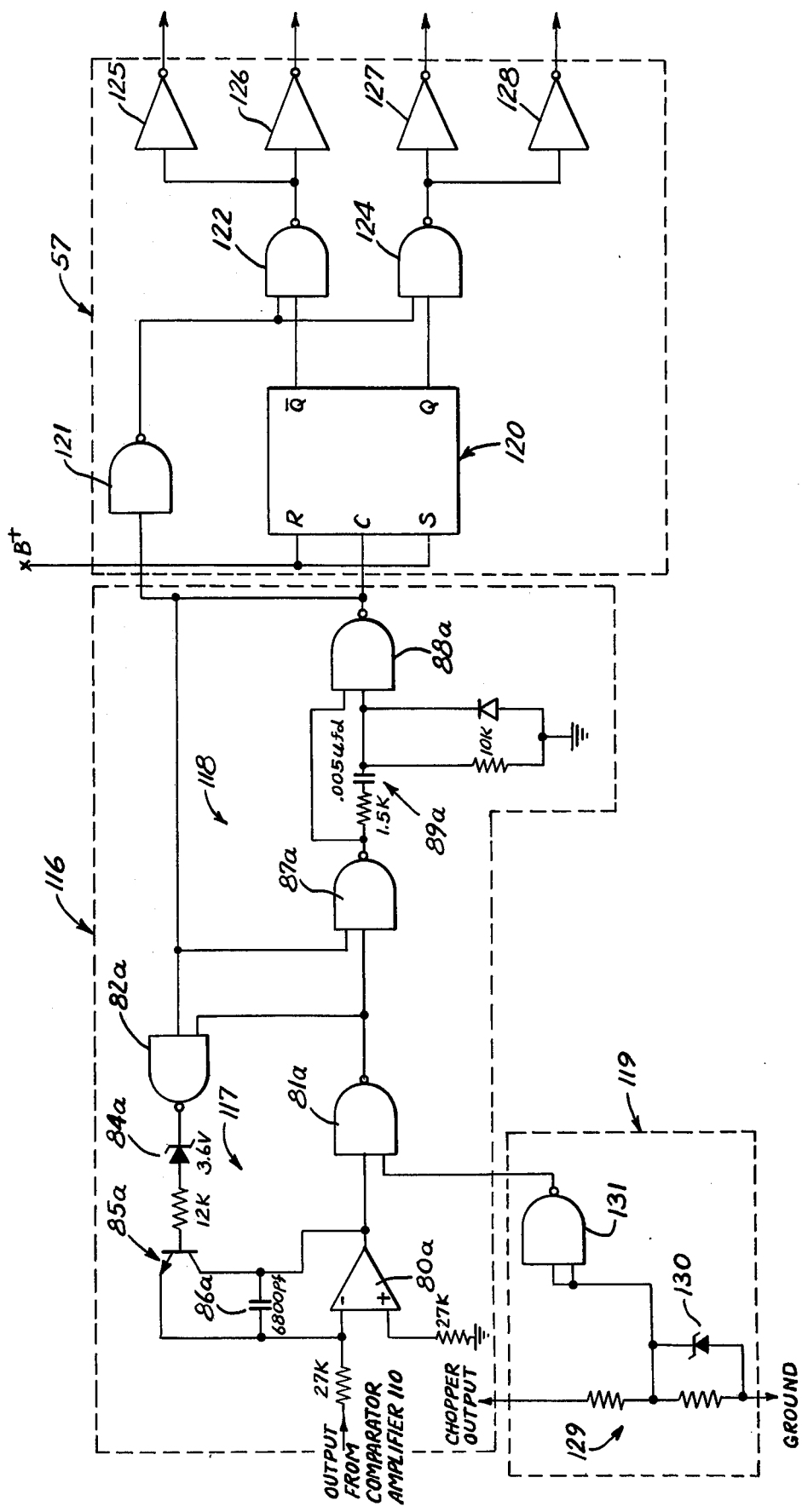
FIG. 4 is a schematic diagram, partially in block form, of the voltage controlled oscillator, the chopper logic and the chopper commutation inhibit circuits shown in FIG. 1.

As shown in FIG. 4, the VCO 116 includes a variable frequency saw tooth oscillator 117 connected to a monostable multivibrator 118, similar to those previously described in the voltage controlled oscillator 77 shown in FIG. 2 and employed with the inverter control circuit 29. Similar parts to those of FIG. 3 are indicated with the same reference numerals with the subscript $a$. One difference is that the NAND circuit 81a is employed as a gate as well as an inverter. Specifically, one of the inputs to the NAND circuit 81a is connected to the normally high output of a chopper commutation inhibit circuit 119, described hereinafter.

The output of the voltage controlled oscillator 116 is supplied to the clock input of an RS flip-flop 120 input which alternately assumes one of two output states in response to each clock pulse and to the input of a NAND circuit 121 which serves as an inverter. The output of the NAND circuit 121 is connected to one input on each of two NAND circuits 122 and 124. One output of the flip-flop 120 is applied to the other input of the first NAND circuit 122 and the other output of the flip-flop 120 is applied to the other input of the other NAND circuit 124. In this way, the NAND circuits 122 and 124 alternately gate the pulse from the multivibrator 118.

The output of the first NAND circuit 122 is coupled to the inputs of two gating pulse amplifiers 125 and 126 for providing an output of suitable level to the gate electrodes of the SCR's 41 and 45 in the chopper 38. Similarly, the output of the second NAND circuit 124 is coupled to the inputs of two gating pulse amplifiers 127 and 128 for the purpose of amplification prior to the application to the gate electrodes of the SCR's 42 and 44 in the chopper 38.

As previously explained, the output current of the chopper circuit 27 is directly proportional to its average frequency of operation. Thus, if the output voltage of the inverter circuit 28 is less than the desired voltage, the feedback voltage increases the average output frequency of the voltage controlled oscillator 116 to thereby increase the duty cycle of the SCR's 41–45 in the chopper 38 and thereby supply more current to the inverter circuit 28. Conversely, if the voltage is higher than the desired voltage, the feedback voltage decreases the average output frequency of the voltage controlled oscillator 116 thereby decreasing the duty cycle of the SCR's 41–45 in the chopper 38, and hence supplying less current to the inverter circuit 28. In this manner, the chopper circuit 27 automatically compensates for variations in amplitude of DC supply voltage, and the varying frequency voltage applied to the load motors. This feature is particularly attractive in air conditioning systems for railway vehicles where the input voltage may vary widely and the power demands of the compressor motor vary with the outside temperature and occupancy of this vehicle.

Use of the high gain comparator amplifier 110 in the control of chopper current is of particular importance. Regulation of the load (motors) voltage and current is accomplished by sensing motor terminal voltages as opposed to the more conventional method of measuring shaft speed. Increases in motor horsepower demand are reflected through motor terminal voltage. In order to provide adequate regulation for the motor loads, rapid response of the chopper frequency is required. Also, stability of the chopper and inverter portions should be maintained during start-up or rapid load changes. Specifically, to provide good regulation and stable operation, it is preferable to rapidly cause the chopper to operate at an instantaneous frequency which is at least six times the maximum inverter output frequency whenever the chopper current falls below the value required to maintain a prescribed terminal voltage. In one application, the VCO116 is designed to operate the chopper at a frequency of 400 to 3000 Hertz over its noload to full-load range for a 60 Hertz inverter output power.

The comparator amplifier 110 has a very high gain so therefore it acts as a zero detector to provide a fast response, on-off operation of the VCO 116. If a minimal negative voltage is applied to the input of the amplifier 110, the output of amplifier 110 rapidly switches to full positive voltage and if a zero or positive voltage is applied to the input, the output rapidly switches to zero voltage. Hence, a series of pulses are applied to the VCO 166, the pulse duration and spacing depending upon the chopper current required to maintain a prescribed voltage at the load terminals. Since the input to the VCO 116 is the integrating amplifier 80, the VCO 116 will produce an output pulse only if the absence of a positive pulse from the comparator amplifier 110 is of sufficient duration to allow a voltage buildup at the output of the integrating amplifier of such magnitude as to overcome the threshold voltage of NAND circuit 81a. In response to both inputs of the NAND gate 81a being raised to logic 1 level, its output goes to logic zero, triggering the monostable multivibrator 118 which generates a negative pulse to drive the flip-flop 120 and inverted 121. The output pulse from the monostable 118 is also fed back through NAND gate 82a and zener diode 84a to the base of transistor 85a which is momentarily switched to a low resistance state, short circuiting capacitor 86a, thus resetting the integrating amplifier 80a. The VCO 116 continues to produce pulses at its maximum rate as long as the comparator amplifier 110 is in its off state (i.e., as long as the chopper current is below the desired operating value). This enables the chopper to rapidly compensate for load changes. At the balanced condition of operation of the drive system, the VCO 116 provides groups of one or more equal duration pulses at a maximum rate, the time between groups of pulses and the number of pulses in each group varying in accordance with variations in the current demand signal. While the instantaneous frequency of the chopper varies between maximum and zero, the average frequency of the chopper varies in accordance with variations in the current demand signal.

Because of its high gain, the voltage feedback circuit 30 has the ability to call for extremely high chopper current to correct a voltage deficiency which may exist at the load terminals. This would occur during motor starting or the abrupt application of additional loads to the system. In these instances the comparator amplifier 105 normally becomes saturated with its output at the maximum positive level permitted by its power supply. Under this condition the chopper would attempt to deliver current limited only by its maximum operating frequency and which may exclude safe levels for components of the drive system.

As a means of current limiting, the chopper current is monitored at shunt 60, amplified and inverted by amplifiers 112 and 114 to provide a negative voltage which is applied to the summation junction 109 through variable resistor 115 which serves as a gain adjustment for the feedback loop 111 and allows a predetermined level of chopper current to override the maximum current demand signal from amplifier 105. From the foregoing it can be seen that an overcurrent condition results in a net negative signal at summation junction 109 which is applied to the inverting input of the comparator amplifier 110. As previously indicated, a negative input signal to comparator 110 results in the inhibition of current producing pulses by VCO 116 for the duration of the overcurrent condition.

In view of the foregoing statements it is possible to appreciate the interrelationship of the first, second, and third feedback circuits in powering a load system consisting of multiple induction motor leads, any combination of which may be cycled on and off at random. For example; the application of an additional induction motor load to a system in operation would result in the following sequence of events. Since the motor in stall presents a low impedance load to the inverter which is a relatively high impedance source, the load terminal voltage instantaneously drops to a low value. The first feedback circuit 29 causes the inverter frequency to fall to a value approximately proportional to the terminal voltage. Simultaneously the second feedback circuit 30 calls for unlimited chopper current while the third feedback 11 limits the chopper circuit to a value that is safe with respect to the drive circuit components but sufficient to start the motor under high slip conditions. As the motor starts to run, its impedance to the drive circuit and therefore its terminal voltage increases.

The first feedback circuit 29 sense the increase in terminal voltage and causes a corresponding increase in inverter frequency and finally the second feedback circuit 30 calls for a decrease in the current demand signal. The process of correction continues until the load terminal voltage reaches its normal level and the system becomes stable with its additional load.

SCR inverters in general are subject to a type of malfunction commonly known as "latch-up", a condition where one or more SCR's either fail to commutate or become switched on extraneously. The inverter in this state presents a virtual short circuit to its power source and the result is probable destruction of drive system components. It should be noted that the previously discussed current limiting feature in combination with its attendant unique chopper configuration provides a means of protection against self destruction without which an SCR inverter can scarcely be considered practical for applications where it must be unattended and provide reliable, uninterrupted service under adverse conditions.

The previously referred to chopped commutation inhibit circuit 119 insures that the output of the chopper 38 is zero before commutation and thereby prevents latch-up of the chopper. The chopper portion of this invention has sufficient versatility to accomodate a range of commutation inhibition methods. One form of inhibit circuit 119 is a voltage inhibit circuit. The circuit 119 as illustrated in FIG. 4, includes a voltage divider 129 connected across both free-wheeling diodes 51 and 52. A zener diode 130 connected across one of the resistors of the voltage divider 129 protects the circuit from high voltages. The output of the voltage divider 129 is connected through a NAND circuit 131 which serves as an inverter to the second input of the NAND circuit 81a in the saw tooth generator 117. Thus, the saw tooth generator 117 is disabled unless the voltage across the diodes 51 and 52 is zero.

Figure 7:
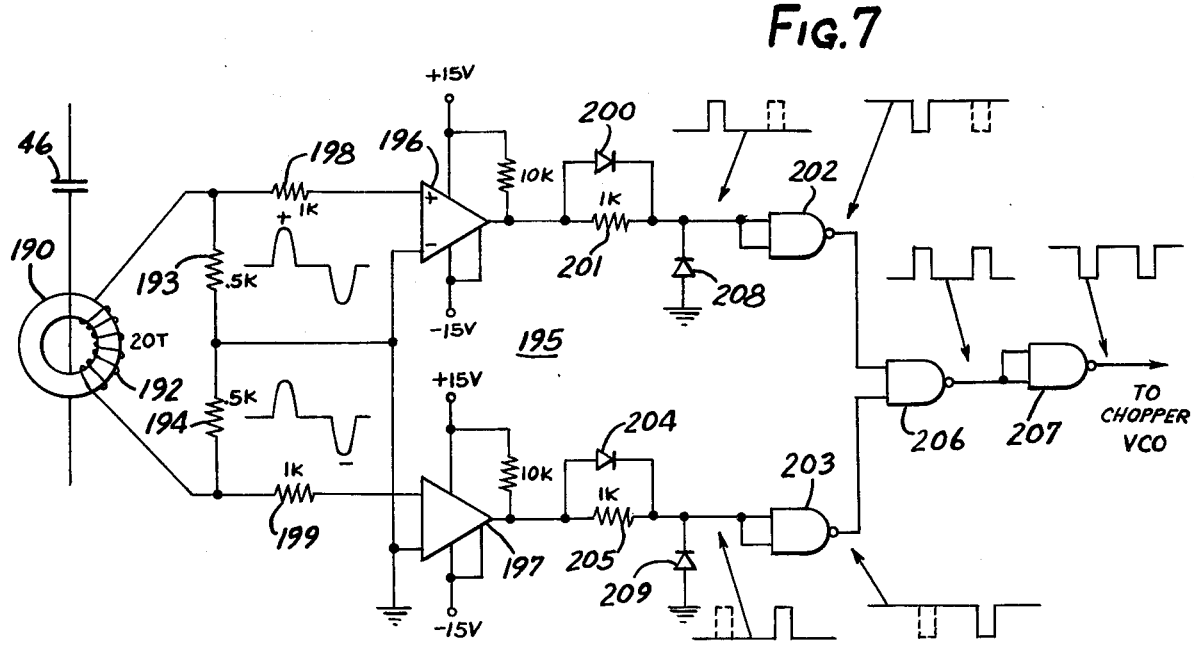
FIG. 7 is a schematic diagram of an alternate embodiment of the chopper commutation inhibit circuit.

While satisfactory operation is provided by the voltage inhibit circuit; under some operating conditions the voltage across free-wheeling diodes 51 and 52 can approach zero while the commutating capacitor current, (reference FIG. 6c, time $t_2'$) has substantial magnitude. At this time firing of SCR's 41 and 45 would result in occasional forced commutation of SCR's 42 and 44. While this method of commutation is entirely satisfactory a preferred and more efficient form of commutation inhibit circuit 119a is shown in FIG. 7. In this method the commutating capacitor 46 current is sensed and an inhibit pulse is provided if current is present. The commutating capacitor 46 current is sensed by a current transformer 190 having its primary inserted in the circuit of commutating capacitor 46. Current flow in capacitor 46 is essentially a series of positive and negative pulses, as shown in FIG. 6c and, therefore, the secondary 192 of transformer 190 develops a current flow as a function of the variation of current flowing in capacitor 46 in the resistors 193 and 194 serially connected across the secondary 192. The presence of absence of current flow is sensed by a zero crossing detector circuit 195 comprising a pair of operational amplifiers 196 and 197 whose noninverting inputs are connected to ground and to the junction of the resistors 193 and 194 and whose inverting inputs are connected respectively through input resistors 198 and 199 to the junction of the resistors 193 and 194 and the secondary 192. In operation with the current flow shown, operational amplifier 196 would have its non-inverting input driven positive output, whereas amplifier 197 would have its noninverting input driven negatively with respect to its inverting input and therefore would have no output. Therefore, current due to the positive output of the operational amplifier 196 flows through a parallel connected diode 200 and resistor 201 to the input of a pulse inverter 202 in the form of a NOR gate. Since operational amplifier 197 has no output, an inverter 203, which is connected through a parallel connected diode 204 and resistor 205, has no output. Because the inputs of a NOR gate 206, which inputs are connected to the respective outputs of the inverters 202 and 203, are high and zero, respectively, a positive pulse appears at the output of the NOR gate 206, which drives an additional inverter 207, comprised of an NOR gate, to produce a negative inhibit pulse. The output of the inverter 207, and thus the inhibit pulse developed, is applied to the NAND gate 81a of the chopper VCO 116 in place of the output of the voltage inhibit circuit 119. Similarly, if the current flow in the commutation capacitor 46 is in the reverse direction, the operational amplifier 197 will develop a positive output providing an inhibit pulse through inverter 203, NOR gate 206 and inverter 207. Diodes, 200, 204, 208, 209 and resistors 201 and 205 insure positive pulse transmission for either direction of current flow.

As described above, the preferred commutation inhibit circuit 119a provides natural commutation for the chopper SCR's resulting in increased chopper efficiency and reliability. Other circuits may be provided to sense the presence of current flow in capacitor 46 and to generate an inhibit pulse when current flow is present.

Figure 5:
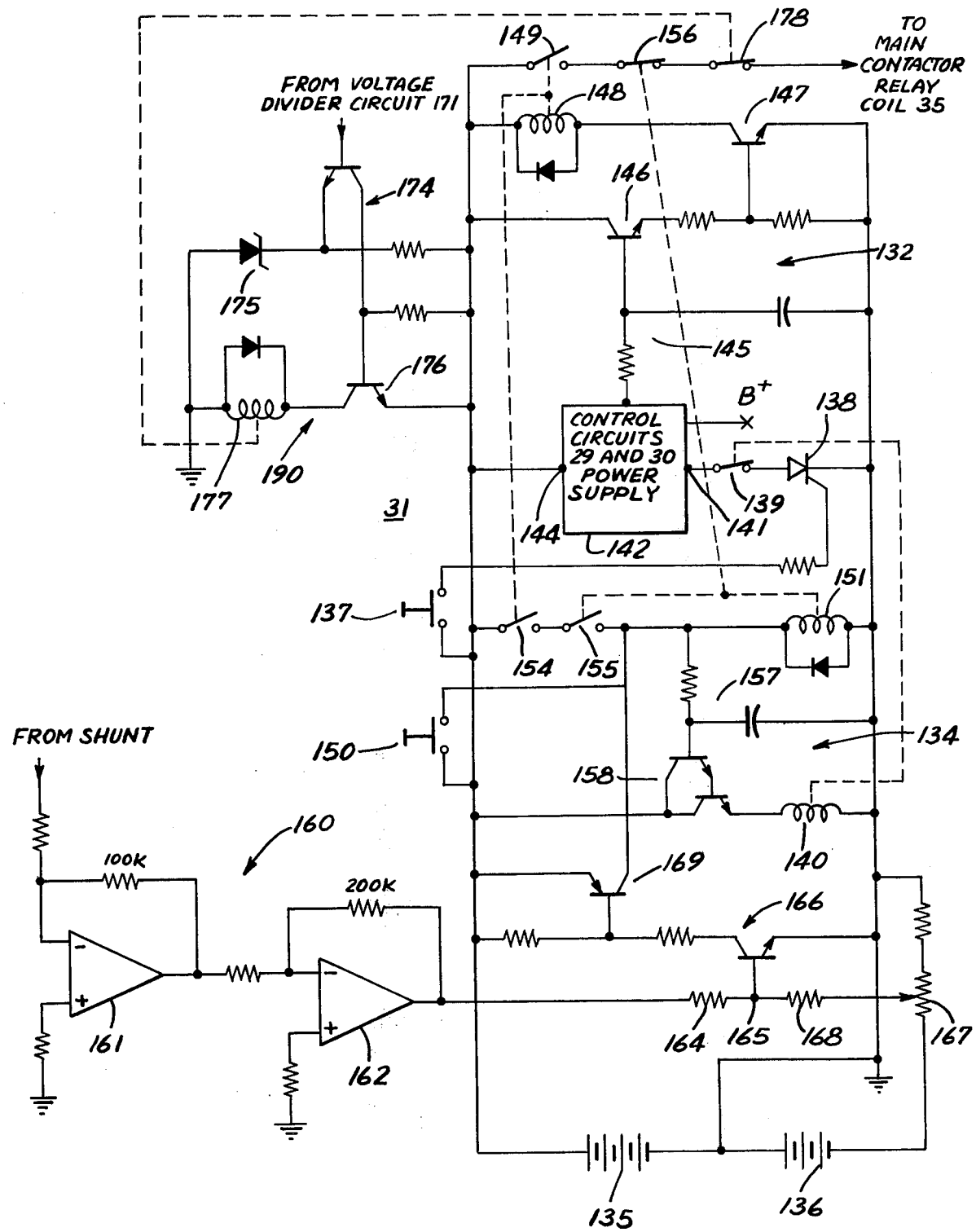
FIG. 5 is a schematic diagram, partially in block form, of the main contactor control, shown in FIG. 1.

As shown in FIG. 5, the main contactor control circuit 31, in accordance with the present invention, not only provides manual on-off operation of drive circuit but also includes a first delay circuit 132 for insuring that power is applied to the inverter and chopper control circuits 29 and 30 before the main contactor 34 is closed and a second delay circuit 134 for maintaining power on the inverter and chopper control circuits 29 and 30 for a short time after manual shutdown of the drive circuit. By maintaining the power on the inverter and chopper control circuits for a short time after shutdown, the inverter circuit 28 will be driven during shutdown thereby permitting the stored energy in the motors 8, 9, 10, and 11 to be dissipated by flowing back through the inverter circuit 28, as well as being dissipated in the ballast resistors 69 connected across the windings of the motors. This protects the SCR's 58 in the inverter circuit 28 during shutdown from any regenerative voltage.

The main contactor control circuit 31 is powered by a positive DC power supply 135 and a negative DC power supply 136, which preferably are the storage batteries carried by the railway vehicle. The contactor control circuit 31 is energized by manually pressing a start button 137 which is connected from the positive power supply 135 to the gate of a silicon controlled rectifier 138. The anode/cathode circuit of the SCR 138 is connected in series with a normally closed contact 139 of a power turn-off relay 140 and this series circuit is connected between a ground connection 141 of a control circuits power supply 142 and ground, which power supply includes the necessary dropping and isolating resistors (not shown) to provide the required positive bias to the elements of the chopper and inverter control circuits 29 and 30. A positive voltage connection 144 of the power supply 142 is connected to the positive power supply 135. Thus, when the start push button 137 is depressed, the power supply 142 is energized thereby providing power to the inverter and chopper control circuits 29 and 30.

When the power supply 142 is energized, it also provides a positive voltage to the first time delay circuit 132. The first time delay circuit 132 includes an RC time delay 145, which energizes a first transistor switch 146 after a short time delay, which in turn, turns on a transistor switch 147 in series with an on relay coil 148, thereby energizing the relay coil. When the on relay 148 is energized, its first normally open contact 149 is closed, which normally open contact is connected between the positive power 135 and the main contactor relay coil 35 thereby closing the main contactor 34 and energizing the drive circuit.

To manually turn off the power drive circuit system, a stop push button 150 is depressed. When the stop push button 150 is depressed, it supplies power from the positive power to an off relay coil 151 energizing the relay coil. A holding circuit is provided for the off relay coil 151 by a normally open contact 154 of the on relay coil 148 and a normally open contact 155 of the off relay coil 151. Energization of the off relay coil 151 opens its normally closed contact 156 which is in series with the main contactor relay coil 35 thereby deenergizing the main contactor relay coil 35 and interrupting current flow to the drive circuit. However, as previously explained, the second delay circuit 134 maintains power on the inverter and chopper circuits 29 and 30 for a short time thereafter to permit the regenerative current from the motors 10 and 20 to pass through the inverter SCR's 58. In this connection, when the stop button 150 is depressed, a voltage is applied to an RC delay circuit 157 which, in turn, is connected to a darlington connected transistor switch 158 connected in series with the power supply turn off relay coil 140. The power supply turn off relay coil 140 being energized opens its normally closed contact 139 thereby deenergizing the control circuit power supply 142 after a short time delay, and the on relay coil 148 which opens the holding contacts 154, 155, of the off relay coil 151.

A circuit 160 is also provided in the main contactor control circuit 31 to remove power from the motor drive circuit when the current output of the chopper circuit 27 exceeds a preselected maximum current. In this connection, the voltage developed across the shunt 60 in the output of the chopper circuit 27 is amplified, as shown in FIG. 4, by a pair of operational amplifiers 161 and 162, and the amplified voltage is applied through an input resistor 164 to a summation junction 165 connected to the base of a transistor 166 connected as a switch. Also, coupled to the summation junction 165 is a negative voltage provided by an adjustable potentiometer 167 connected between the negative power supply 136 and ground, the adjustable tap of the potentiometer 167 being connected through an input resistor 168 to the junction 165. When the voltage fed to the junction 165 from the amplifier 162, which indicates the current flow in the chopper circuit 27, exceeds the voltage selected by the potentiometer 167, which is set to select the maximum permissible chopper current, the transistor 166 switches thereby also switching a second transistor 169 connected to the output of the first transistor 166. The switching of the second transistor 169 energizes the off relay 151, the collector-emitter circuit of the second transistor 169 by passing the stop button 150. As previously indicated, the energization of this off relay 151 causes the main contactor relay coil 35 to be deenergized and then, after a short time dealy, the control circuit power supply 142.

A circuit 170 is also provided in the main contactor control circuit 31 to disconnect the high voltage power from the motor drive circuit if voltage transients on the third rail 24 exceed a predetermined amplitude. The transient voltage protection circuit 170 includes a high impedance voltage divider circuit 171 (see FIG. 1) connected across the input to the motor drive circuit. A potentiometer 172 is provided in the voltage divider circuit 171 and its tap, as shown in FIG. 4, is connected to the base of a first transistor switch 174 which switches at a set input voltage as determined by a Zener diode 175 connected in its emitter circuit. Thus, by adjusting the tap on the potentiometer, the transient voltage at which the first transistor 174 switches is adjusted. Switching of the first transistor switches a second transistor switch 176, connected thereto, which has its emitter-collector circuit connected in series with a relay coil 177, thereby energizing the same. A normally closed contact 178 of a relay coil is connected in series with the main contactor relay coil 35. Thus, the main contactor relay coil is deenergized when the transients exceed a certain predetermined voltage. However, as soon as the amplitude of the transient decreases below the preset value, the relay coil 177 is denergized, and the main contactor relay coil 35 is energized thereby reapplying power to the motor drive circuit.

Thus, a novel motor drive circuit is provided which operates from the third rail of a railway vehicle or other such power sources. The circuit can operate a plurality of induction motors (e.g., compressor motors, fan motors, etc.) during start-stop conditions. The system reliability is exceptional under the adverse conditions normally associated with power supplies for railway vehicles.

In certain applications, it is desired to drive a variable speed compressor (e.g., a helical screw compressor) at an adjustable speed. This may be accomplished in the illustrated embodiment by substituting an adjustable voltage supply for the negative voltage supply 106. By adjusting the amplitude of this voltage, the motor voltage may be controlled, which in turn controls the frequency of the motor voltage. As is well known, by controlling the frequency of the motor voltage, the speed of the induction motor may be controlled. Of course, the adjustable voltage may be automatically adjusted by means of a thermostat, in a conventional manner, and thus the operating speed of the compressor may be regulated in accordance with the temperature of the interior of the vehicle.

Various other changes and modifications may be made in the above-described motor drive circuit without deviating from the spirit or scope of the present invention. Various features of the invention are set forth in the appended claims.

What is claimed is:

1. A drive circuit for an induction motor used in an air conditioning system of a railway vehicle operable from a source of high voltage direct current, said current comprising a chopper circuit connected to said direct current source for converting the high voltage direct current to a regulated direct current and an inverter circuit connected to the output of said chopper circuit for converting the regulated direct current into alternating current at a regulated frequency, means for applying said alternating current to the induction motor, a first feedback means for developing a first feedback signal indicative of the voltage applied to the motor and applying said first feedback signal to said inverter circuit to regulate its output frequency in a direct relation to said motor voltage, and a second feedback means for providing a second feedback signal indicative of the voltage applied to the motor and applying said second feedback signal to said chopper circuit to regulate its output current in inverse relation to said motor voltage, said chopper circuit including a commutating inductor, first and second controlled rectifiers serially coupled between one terminal of said high voltage source and one terminal of said commutating inductor, third and fourth controlled rectifiers serially coupled between said one terminal of said high voltage source and said one terminal of said commutating inductor, a commutating capacitor coupled between the junction of said first and second controlled rectifiers and the junction of said third and fourth controlled rectifiers, means for coupling said inverter circuit between the remaining terminal of said commutating inductor and the remaining terminal of said high voltage source, a unidirectional current conducting device coupled between said one terminal of said commutating inductor and said remaining terminal of said high voltage source, said uni-directional current conducting device being connected so as to be back-biased by the voltage applied to said one terminal of said commutating inductor, and a control circuit means alternately rendering said first and fourth and said second and third controlled rectifiers conductive to cyclically charge said commutating capacitor in opposite directions to establish a uni-directional current through said commutating inductor, said second feedback means being connected to said control circuit means so as to regulate the frequency of the cyclical charges as an inverse function of the motor voltage.

2. A drive circuit in accordance with claim 1 wherein the inverter circuit includes six controlled rectifiers connected in a three-phase bridge circuit arrangement, the induction motor is three-phase with its three field windings connected to the center connections of the bridge circuit, six commutating capacitors are connected in commutating relation between the controlled rectifiers, and unidirection of current conducting devices are connected in the bridge circuit so as to isolate the capacitors from the field windings, a frequency control circuit means is provided for gating the control rectifiers in an order such as to produce a three-phase output signal the frequency of which is varied in accordance with the amplitude of its input signal, and said first feedback signal is applied to the input of said frequency control circuit means.

3. A drive circuit in accordance with claim 1, wherein said control circuit means has an integrating means at its input and has a maximum operating frequency and a minimum operating frequency, said maximum frequency being at least six times the inverter output frequency, and said second and third feedback signals are connected through a high gain amplifier to said integrating means to thereby cause said chopper to cyclically charge said commutating capacitor at said maximum frequency whenever said output chopper current decreases below a preselected value and at the minimum frequency whenever said output chopper current increases above the preselected value.

4. A drive circuit in accordance with claim 1, wherein a third feedback means is provided for developing a third feedback signal indicative of fast changes in the output current of said chopper circuit and applying said third feedback signal to said chopper control circuit to regulate the frequency of the cyclical charge and discharge as an inverse function of said third feedback signal, and said second feedback means includes means reducing the regulating effect of said second feedback signal during fast changes in said second feedback signal.

5. A drive circuit in accordance with claim 4, wherein said control circuit means has an integrating means at its input and has a maximum operating frequency and a minimum operating frequency, said maximum frequency being at least six times the inverter output frequency, and said second and third feedback signals are connected through a high gain amplifier to said integrating means to thereby cause said chopper to cyclically charge said commutating capacitor at said maximum frequency whenever said output chopper current decreases below a preselected value and at the minimum frequency whenever said output chopper current increases above the preselected value.

6. A drive circuit in accordance with claim 4, wherein an inhibit means is provided which is responsive to the current flowing through said commutating capacitor and is coupled to said chopper control circuit to inhibit operation of said control circuit when current is flowing through said capacitor.

7. A drive circuit in accordance with claim 4, wherein an inhibit means is provided which is responsive to the voltage appearing across the unidirectional current conducting device and is coupled to said chopper control circuit to inhibit operation of said control circuit when a predetermined voltage is present across said unidirectional current conducting device.

8. A drive circuit in accordance with claim 4 wherein the inverter circuit includes six controlled rectifiers connected in a three-phase bridge circuit arrangement, the induction motor is three-phase with its three field windings connected to the center connections of the bridge circuit, six commutating capacitors are connected in commutating relation between the controlled rectifiers, and unidirection of current conducting devices are connected in the bridge circuit so as to isolate the capacitors from the field windings, a second control circuit means is provided for gating the control rectifiers in an order such as to produce a three phase output signal the frequency of which is varied in accordance with the amplitude of its input signal, and said first feedback signal is applied to the input of said second control circuit means.

9. A drive circuit in accordance with claim 8, wherein said control circuit means has an integrating means at its input and has a maximum operating frequency and a minimum operating frequency, said maximum frequency being at least six times the inverter output frequency, and said second and third feedback signals are connected through a high gain amplifier to said integrating means to thereby cause said chopper to cyclically charge said commutating capacitor at said maximum frequency whenever said output chopper current decreases below a preselected value and at the minimum frequency whenever said output chopper current increases above the preselected value.

10. A drive circuit in accordance with claim 8, wherein an inhibit means is provided which is responsive to the voltage appearing across the unidirectional current conducting device and is coupled to said chopper control circuit to inhibit operation of said control circuit when a predetermined voltage is present across said unidirectional current conducting device.

11. A drive circuit in accordance with claim 8, wherein an inhibit means is provided which is responsive to the current flowing through said commutating capacitor and is coupled to said chopper control circuit to inhibit operation of said control circuit when current is flowing through said capacitor.

12. A drive circuit in accordance with claim 8 wherein a main power on-off means is provided for controlling the connection of said drive circuit to said high voltage source, said on-off means includes an auxiliary power means for supplying power to said inverter control circuit means for operating the same, and first delay means for applying said auxiliary power to said inverter control circuit for a predetermined time after said drive circuit is disconnected from said high voltage source, and ballast resistors are connected across said field windings.

13. A drive circuit in accordance with claim 12 wherein said main power on-off means includes an on-switch for connecting said high voltage source to said drive circuit, and a second delay means for delaying the connection of voltage to said drive circuit for a predetermined time after said on-switch is actuated.

14. A drive circuit in accordance with claim 13, wherein an inhibit means is provided which is responsive to the voltage appearing across the unidirectional current conducting device and is coupled to said chopper control circuit to inhibit operation of said control circuit when a predetermined voltage is present across said unidirectional current conducting device.

15. A drive circuit in accordance with claim 13, wherein an inhibit means is provided which is responsive to the current flowing through said commutating capacitor and is coupled to said chopper control circuit to inhibit operation of said control circuit when current is flowing through said capacitor.

16. A drive circuit for an induction motor used in an air conditioning system of a railway vehicle operable from a source of high voltage direct current, said circuit comprising a chopper circuit connected to said direct current source for converting the high voltage direct current to a regulated direct current and an inverter circuit connected to the output of said chopper circuit for converting the regulated direct current into alternating current at a regulated frequency, means for applying said alternating current to the induction motor, a first feedback means for developing a first feedback signal indicative of the voltage applied to the motor and applying said first feedback signal to said inverter circuit to regulate its output frequency in a direct relation to said motor voltage, a second feedback means for providing a second feedback signal indicative of the voltage applied to the motor and applying said second feedback signal to said chopper circuit to regulate its output current in inverse relation to said motor voltage, said inverter circuit including six controlled rectifiers connected in a three-phase bridge circuit arrangement, said induction motor being three-phase with its three field windings connected to the center connections of the bridge circuit, six commutating capacitors connected in commutating relation between the controlled rectifiers, and unidirectional current conducting devices connected in the bridge circuit so as to isolate the capacitors from the field windings, a control circuit means for gating the control rectifiers in an order such as to produce a three-phase output signal the frequency of which is varied in accordance with the amplitude of its input signal, said first feedback signal being applied to the input of said control circuit means, a main power on-off means for controlling the connection of said drive circuit to said high voltage source, said on-off means including an auxiliary power means for supplying power to said inverter control circuit means for operating the same, and first delay means for applying said auxiliary power to said inverter control circuit for a predetermined time after said drive circuit is disconnected from said high voltage source, and ballast resistors connected across said field windings.

17. A drive circuit in accordance with claim 16 wherein said main power on-off means includes an on-switch for connecting said high voltage source to said drive circuit, and a second delay means for delaying the connection of voltage to said drive circuit for a predetermined time after said on-switch is actuated.

18. A drive circuit for an AC inductive load from a source of direct current, said circuit comprising a chopper circuit connected to said direct current source for converting the direct current to a regulated direct current and means connected to the output of said chopper circuit for converting the regulated direct current into alternating current, means for applying said alternating current to the load, a feedback means for providing a feedback signal indicative of the voltage applied to the load and applying said feedback signal to said chopper circuit to regulate its output current in inverse relation to said load voltage, said chopper circuit including a commutating inductor, first and second controlled rectifiers serially coupled between one terminal of said source and one terminal of said commutating inductor, third and fourth controlled rectifiers serially coupled between said one terminal of said source and said one terminal of said commutating inductor, a commutating capacitor coupled between the junction of said first and second conrolled rectifiers and the junction of said third and fourth controlled rectifiers, means for coupling said converting means between the remaining terminal of said commutating inductor and the remaining terminal of said source, a unidirectional current conducting device coupled between said one terminal of said commutating inductor and said remaining terminal of said source, said unidirectional current conducting device being connected so as to be back-biased by the voltage applied to said one terminal of said commutating inductor, a control circuit means alternately rendering said first and fourth and said second and third controlled rectifiers conductive to cyclically charge said commutating capacitor in opposite directions to establish a uni-directional current through said commutating inductor, said feedback means being connected to said control circuit means so as to regulate the frequency of the cyclical charges as an inverse function of themotor voltage and additional feedback means coupled to said control circuit means for causing said chopper circuit to provide a predetermined maximum current during fast changes in the current demand of the load.

19. A drive circuit in accordance with claim 18, wherein said additional feedback means develops an additional feedback signal indicative of fast changes in the output current of said chopper circuit and applies said additional feedback signal to said chopper control circuit to regulate the frequency of the cyclical charge and discharge as an inverse function of said additional feedback signal to thereby provide a maximum chopper output current level during fast changes, and said feedback means includes means reducing the regulating effect of said first feedback isgnal during fast changes in said first feedback signal.

20. A drive circuit for an induction motor used in an air conditioning system of a railway vehicle operable from a source of high voltage direct current, said circuit comprising a chopper circuit connected to said direct current source for converting the high voltage direct current to a regulated direct current and an inverter circuit connected to the output of said chopper circuit for converting the regulated direct current into alternating current at a regulated frequency, means for applying said alternating current to the induction motor, a first feedback means for developing a first feedback signal indicative of the voltage applied to the motor and applying said first feedback signal to said inverter circuit to regulate its output frequency in a direct relation to said motor voltage, a second feedback means for providing a second feedback signal indicative of the voltage applied to the motor and applying said second feedback signal to said chopper circuit to regulate its output current in inverse relation to said motor voltage and a third feedback means for developing a third feedback signal indicative of fast changes in the output current of said chopper circuit and applying said third feedback signal to the chopper circuit to regulate the output current, said second feedback means including means for reducing the regulating effect of said second feedback signal during fast changes in said second feedback signal.

21. A drive circuit for an induction motor used in an air conditioning system of a railway vehicle operable from a source of high voltage direct current, said circuit comprising a chopper circuit connected to said direct current source for converting the high voltage direct current to a regulated direct current and an inverter circuit connected to the output of said chopper circuit for converting the regulated direct current into alternating current at a regulated frequency, means for applying said alternating current to the induction motor, a first feedback means for developing a first feedback signal indicative of the voltage applied to the motor an applying said first feedback signal to said inverter circuit to regulate its output frequency in a direct relation to said motor voltage, a second feedback means for providing a second feedback signal indicative of the voltage applied to the motor and applying said second feedback signal to said chopper circuit to regulate its output current in inverse relation to said motor voltage and a third feedback means for developing a third feedback signal indicative of the output current of said chopper circuit and applying said third feedback signal to said chopper circuit to regulate the output current of the chopper circuit, said third feedback means having a gain which is substantially less than the gain of said second feedback means, said second feedback means including means for reducing the effect of said second feedback signal on said chopper circuit during fast changes in the motor voltage, whereby during fast changes the output current of the chopper circuit is regulated by said third feedback means while during slow changes in the motor voltage the output current in the chopper circuit is regulated by said feedback means.

22. A drive circuit for at least one induction motor comprising means for supplying a high voltage direct current, a chopper circuit connected to said direct current source for converting the high voltage direct current to a regulated direct current and an inverter circuit connected to the output of said chopper circuit for converting the regulated direct current into alternating current at a regulated frequency, maximum operating frequency and a minimum operating frequency, said maximum frequency being at least six times the inverter output frequency, and a high gain amplifier coupling said current feedback means to said integrating means to thereby cause said chopper to cyclically charge said commutating capacitor at said maximum frequency whenever said output chopper current decreases below a preselected value and at the minimum frequency whenever the output chopper current increases above the preselected value.

23. A drive circuit in accordance with claim 22 wherein a voltage feedback means provides a voltage feedback signal indicative of the voltage applied to the motor and applies said voltage feedback signal to said high gain amplifier to regulate the chopper output current in inverse relation to said motor voltage, said voltage feedback means including means for reducing the regulating effect of said voltage feedback means during fast changes in said voltage feedback signal.

24. A drive circuit in accordance with claim 23 wherein the inverter circuit includes six controlled rectifiers connected in a three-phase bridge circuit arrangement, the induction motor is three-phase with its three field windings connected to the center connections of the bridge circuit, six commutating capacitors are connected in commutating relation between the controlled rectifiers, and unidirection of current conducting devices are connected in the bridge circuit so as to isolate the capacitors from the field windings, a frequency control circuit means is provided for gating the control rectifiers in an order such as to produce a three-phase output signal the frequency of which is varied in accordance with the amplitude of its input signal, and said first feedback signal is applied to the input of said frequency control circuit means.

25. A drive circuit in accordance with claim 22 wherein the inverter circuit includes six controlled rectifiers connected in a three-phase bridge circuit arrangement, the induction motor is three-phase with its three field windings connected to the center connections of the bridge circuit, six commutating capacitors are connected in commutating relation between the controlled rectifiers, and unidirection of current conducting devices are connected in the bridge circuit so as to isolate the capacitors from the field windings, a frequency control circuit means is provided for gating the control rectifiers in an order such as to produce a three phase output signal the frequency of which is varied in accordance with the amplitude of its input signal, and said first feedback signal is applied to the input of said frequency control circuit means.

* * * * *